US012519242B2

(12) United States Patent
Smith et al.

(10) Patent No.: US 12,519,242 B2
(45) Date of Patent: Jan. 6, 2026

(54) MONOPALM COLLOCATION DESIGN

(71) Applicant: DISH Wireless L.L.C., Littleton, CO (US)

(72) Inventors: Robert E. Smith, Phoenix, AZ (US); Terry Duffield, Scottsdale, AZ (US); John Crow, Scottsdale, AZ (US); Clark McQueen, Cold Spring, MN (US)

(73) Assignee: DISH Wireless L.L.C., Littleton, CO (US)

(*) Notice: Subject to any disclaimer, the term of this patent is extended or adjusted under 35 U.S.C. 154(b) by 194 days.

(21) Appl. No.: 18/454,586

(22) Filed: Aug. 23, 2023

(65) Prior Publication Data

US 2024/0136721 A1 Apr. 25, 2024
US 2024/0235036 A9 Jul. 11, 2024

Related U.S. Application Data

(60) Provisional application No. 63/380,179, filed on Oct. 19, 2022.

(51) Int. Cl.
*H01Q 9/30* (2006.01)
*H01Q 1/44* (2006.01)

(52) U.S. Cl.
CPC ................. *H01Q 9/30* (2013.01); *H01Q 1/44* (2013.01)

(58) Field of Classification Search
CPC .. H01Q 9/30; H01Q 9/32; H01Q 9/40; H01Q 1/12; H01Q 1/1207; H01Q 1/1228; H01Q 1/1242; H01Q 1/20; H01Q 1/36; H01Q 1/44
See application file for complete search history.

(56) References Cited

U.S. PATENT DOCUMENTS 5,611,176 A * 3/1997 Juengert .............. H01Q 1/1242 428/18
5,787,649 A * 8/1998 Popowych ............... H01Q 1/44 52/651.07
6,122,866 A * 9/2000 Thomas ................. A41G 1/001 343/890
6,286,266 B1 * 9/2001 Popowych ............... H01Q 1/44 52/40
6,343,440 B1 * 2/2002 Ayers ................... H01Q 1/1242 52/651.07

(Continued)

*Primary Examiner* — Jason M Crawford
(74) *Attorney, Agent, or Firm* — Kilpatrick Townsend & Stockton LLP

(57) ABSTRACT

A multi-antenna structure may include a monopole and a first antenna array connected to the monopole at a first location via a first mounting apparatus and including a first cellular antenna and a first radio unit. The structure may also include a second antenna array connected to the monopole at a second location via a second mounting apparatus, with a second cellular antenna and a second radio unit. The structure may include a first set of fronds arranged about an outer surface of the monopole, forming a first respective angle with the monopole and configured to obscure the first antenna array from view. The structure may include a second set of fronds arranged about the outer surface of the monopole, each of the second set of fronds forming second respective angle with the monopole. The second set of fronds may be configured to obscure the second antenna array from view.

19 Claims, 5 Drawing Sheets

(56) References Cited

U.S. PATENT DOCUMENTS

| | | | | |
|---|---|---|---|---|
| 6,434,889 | B1 * | 8/2002 | Jones | H01Q 1/44 428/7 |
| 8,094,083 | B1 * | 1/2012 | Tam | H01Q 21/28 343/788 |
| 8,749,449 | B2 * | 6/2014 | Caldwell | H01Q 1/1207 343/890 |
| 9,698,477 | B1 * | 7/2017 | Jabara | E04H 12/342 |
| 11,207,988 | B2 * | 12/2021 | Lyden | B60L 53/12 |
| 11,955,700 | B1 * | 4/2024 | Oberman | H01Q 9/32 |
| 2002/0184833 | A1 * | 12/2002 | Jones | H01Q 1/44 343/890 |
| 2004/0174317 | A1 * | 9/2004 | Dearnley | H01Q 3/26 343/890 |
| 2008/0012784 | A1 * | 1/2008 | Renfro | H01Q 1/1242 343/890 |
| 2020/0044453 | A1 * | 2/2020 | Lyden | H10F 19/00 |
| 2022/0115762 | A1 * | 4/2022 | Tsorng | H01Q 1/1228 |
| 2024/0136721 | A1 * | 4/2024 | Smith | H01Q 9/30 |
| 2024/0235036 | A9 * | 7/2024 | Smith | H01Q 9/30 |

* cited by examiner

MONOPALM COLLOCATION DESIGN

CROSS REFERENCE TO RELATED APPLICATIONS

This application claims priority to U.S. Provisional Patent Application No. 63/380,179, filed on Oct. 19, 2022, the disclosure of which is incorporated by reference in its entirety for all purposes.

BACKGROUND OF THE INVENTION

Monopalms are monopoles disguised as palm trees. These structures are popular in tropical and desert climates in the United States, as well as in comparable climates around the world. Monopalms are usually single-carrier wireless facilities disguised as palm trees. Such monopalms typically have a set of antennas mounted at a top of the monopalm, and the antennas are typically concealed using manufactured palm fronds.

BRIEF SUMMARY

A multi-antenna structure may include a monopole and a first antenna array mechanically connected to the monopole at a first location via a first mounting apparatus. The first antenna array may also include a first cellular antenna and a first radio unit. The structure may also include a second antenna array mechanically connected to the monopole at a second location via a second mounting apparatus, with a second cellular antenna and a second radio unit. The structure may include a first set of fronds arranged about an outer surface of the monopole where each of the first set of fronds forms a first respective angle with the monopole. The first set of fronds may be configured to obscure the first antenna array from view. The structure may include a second set of fronds arranged about the outer surface of the monopole where each of the second set of fronds forms a second respective angle with the monopole. The second set of fronds may be configured to obscure the second antenna array from view.

In some embodiments, the first mounting apparatus may include a first antenna standoff mechanically connected to the monopole and a first mounting pole, where the first antenna standoff provides an adjustable first distance between the first antenna array and the monopole. The second mounting apparatus may include a second antenna standoff mechanically connected to the monopole and a second mounting pole, where the second antenna standoff allows an adjustable second distance between the second antenna array and the monopole. The first mounting apparatus and the second mounting apparatus may be mechanically connected to the monopole via one or more clamps. The first mounting apparatus and the second mounting apparatus may allow the first antenna array and the second antenna array to be moved vertically along the monopole. Each of the first respective angles may be within a first range of 0° to 150°, inclusive. Each of the second respective angles may be within a second range of 90° to 180°, inclusive. Each of the one or more band collars may support one or more fronds of the first set of fronds and/or the second set of fronds. Each band collar of the one or more band collars may be mechanically connected to another band collar of the one or more band collars and the one or more band collars are connected to the monopole via compression. The first antenna array and the second antenna array may allow the first cellular antenna and the second cellular antenna, respectively, to be tilted with respect to the monopole. The first antenna array may be associated with a first cellular network provider and the second antenna array may be associated with a second cellular network. The first antenna array and the second antenna array may be associated with a first cellular network provider.

In some embodiments, each of the first set of fronds may include a shaft with a horizontal section and a down section. The horizontal section and the down section may meet at the first respective angle. Each of the second set of fronds may include a shaft with a horizontal section and a down section, where the horizontal section and the down section meet at the second respective angle. The horizontal section and the down section may include separate pieces, connected such that the second respective angle may be adjusted. Cabling may be disposed within the monopole. At least one of the first antenna array and the second antenna array may include one or more components of a 5G cellular network. The first respective angle and the second respective angle may be adjustable.

In an embodiment, a method may include attaching an antenna assembly on an existing cellular antenna structure. The existing cellular antenna structure may include a first antenna array. the antenna assembly may include a mounting bracket, an antenna standoff, a radio unit, and a second antenna array. The method may then include positioning the mounting bracket on the existing cellular antenna structure such that the second antenna array is below the first antenna array. The method may include adjusting a position of the second antenna array to achieve a performance metric. The method may include attaching a set of fronds configured to obscure the antenna assembly from view. The method may include providing cellular network service using the second antenna array.

In some embodiments, a horizontal section of a palm frond of the set of palm fronds and a down section of the palm fronds may include separate pieces and are connected such that the second respective angle may be adjusted. The set of fronds is angled towards the ground. The cellular network service may include a 5G cellular network.

DETAILED DESCRIPTION OF THE INVENTION

Figure 1B:
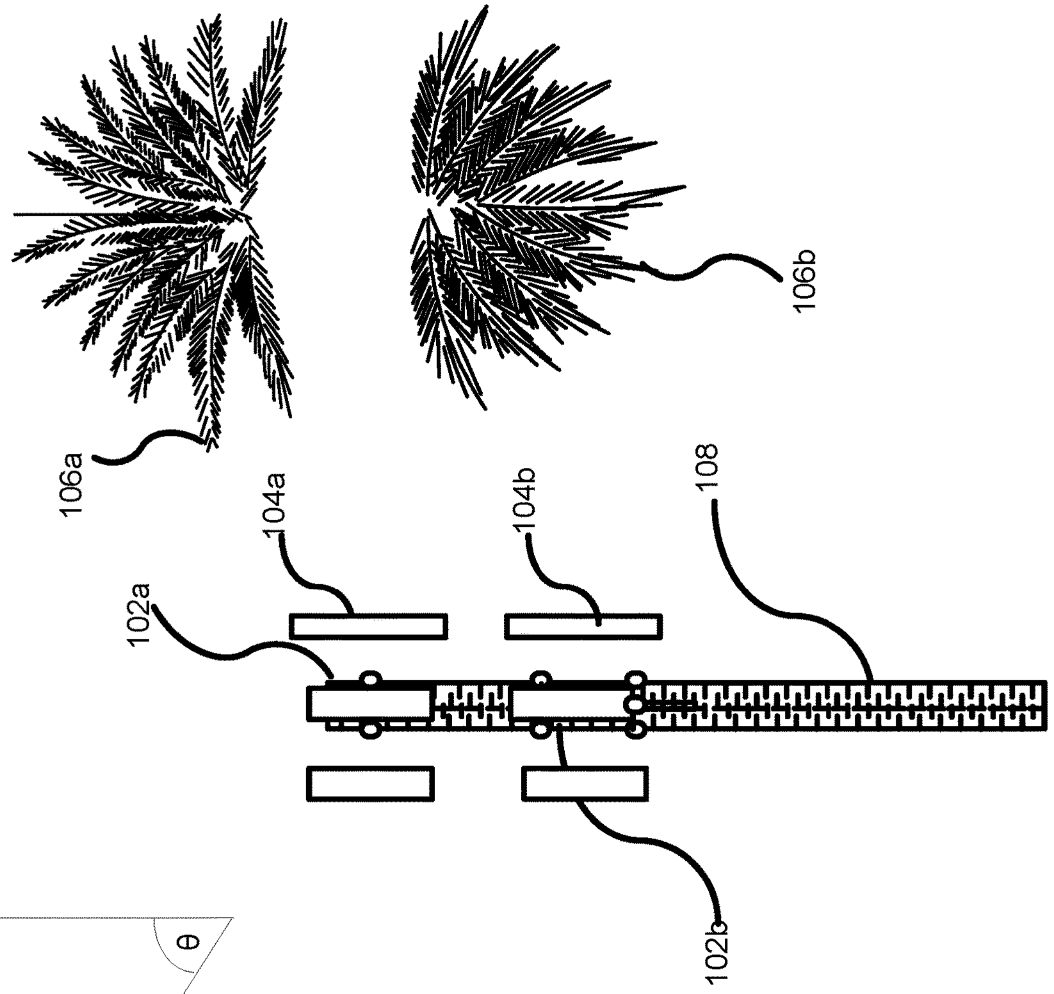
FIG. 1B illustrates an exploded view of a monopalm with two antenna arrays, according to certain embodiments.

In some local government regulations, monopalms are required to be "anatomically correct." For example, the city of Phoenix has design guidelines indicating that the "trimmed leaf cluster" (pineapple shaped trimmed fronds) must be mounted directly beneath the palm fronds and be painted to blend with the pole structure (and the required faux bark on the pole.)

Such a requirement presents a challenge for mounting a second set of antennas on an existing monopalm that already has a first set of antennas mounted on the top of the monopalm. Such a mount condition is referred to as collocation of a second antenna array to a monopalm or simply "collocation" herein. In considering that local government requirements often demand that a collocation has to be "anatomically correct" (i.e., disguised in a convincing manner), the second set of antennas have to be positioned and convincingly disguised on the monopalm in a way that a casual observer would recognize the monopalm, as a whole, still looks like a palm tree.

It is observed that existing methods for collocating a second antenna array to a monopalm typically fail to satisfy the "anatomically correct" or "convincingly disguised" requirement mentioned above. For example, one existing method places the second antenna array underneath the space covered by the existing palm head of a particular monopalm and uses a bark-like sleeve to cover the second antenna array. This typically does not match how a palm tree looks in nature. In general, a majority of single carrier monopalms (e.g., only one set of antennas are mounted and disguised) remain as such because it is difficult to create a collocation and deploy it in a way that achieves a convincing appearance to satisfy the "anatomically correct" or "convincingly disguised" requirement. This is why many local governments have not allowed collocations (installation of second antenna arrays) to monopalms.

One solution may be the collocation of multiple antenna arrays on the monopalm, ensuring that the palm frond head remains one single unified palm head on the tree. The proportionality of the frond head may be preserved to create a convincing disguise across both antenna arrays. For achieving that, a few considerations are taken into account when designing a second collocation that satisfies the "anatomically correct" or "convincingly disguised" requirement.

One consideration is that the space occupied by the equipment installed on the monopole (trunk) of the monopalm should be minimized, so that horizontal extension of that equipment is reduced to the extent that the collocation does not look unnaturally bulky and is successfully disguised by the installation of manufactured palm fronds. Another consideration may be the vertical space occupied by the equipment's extension along the trunk of the monopalm. The vertical space may be minimized so the equipment can be effectively hidden by fronds which are of an appropriate size and proportion. These considerations may create a natural appearance of a palm tree after the collocation is installed accordingly.

Still another consideration may be the adjustability of the mounting apparatus. The mounting apparatus may be adjusted according to the existing palm head covering the first set of antennas spacing required between the first set of antennas and the new, collocating antenna array, and the horizontal and vertical spaces occupied by the new, collocated antenna array. The mounting apparatus may therefore mount the second set of antennas and the required manufactured fronds in a way that the collocation's appearance merges with the existing palm head's appearance. This may result in a unified, or single palm frond head for the monopalm.

Figure 1A:
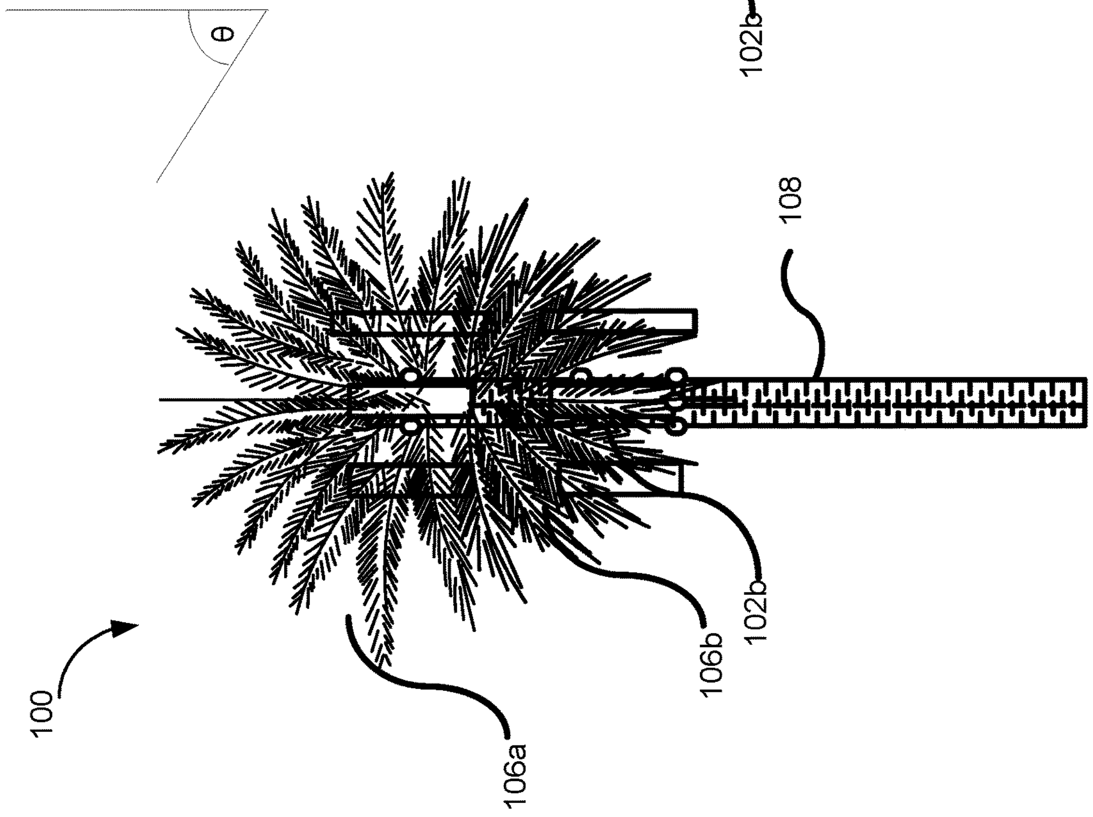
FIG. 1A illustrates a monopalm with a two antenna arrays, according to certain embodiments.

FIG. 1A illustrates a monopalm 100 with a two antenna arrays 104*a-b*, according to certain embodiments. FIG. 1B illustrates an exploded view of a monopalm 100 with two antenna arrays 104*a-b*, according to certain embodiments. The monopalm 100 may include a monopole 108 with a first location 102*a* and a second location 102*b*. The antenna array 104*a* may be attached to the monopole 108 at the first location 102*b*. The second antenna array 104*b* may be attached to the monopole at the second location 102*b*. A first set of palm fronds 106*a* may be attached to the monopole 108 such that the first set of palm fronds 106*a* obscures at least some of the first antenna array 104*a* and/or the second antenna array 104*b*. A second set of palm fronds 106*b* may be attached to the monopole 108 such that the second set of palm fronds 106*b* obscures at least some of the first antenna array 104*a* and/or the second antenna array 104*b*.

The first and second antenna arrays 104*a-b* may be attached to the monopole 108 via respective mounting apparatuses that allows the first and second antenna arrays 104*a-b* to be moved in relation to the monopole 108. For example, one or both of the first and second antenna arrays 104*a-b* may be translated vertically along the monopole 108, rotated about the monopole 108, or moved radially outward from the monopole 108. The respective mounting apparatuses may also allow the first and second antenna arrays 104*a-b* to be tilted up and/or down. The first and/or second antenna arrays 104*a-b* may include components enabling one or more cellular networks including 5G New Radio (NR), 4G LTE, 6G, 7G, etc. Although only two antenna arrays are shown, there may be any number of antenna arrays on the monopalm 100.

In some embodiments, the monopalm 100 may be retrofit to collocate antennas associated with multiple cellular network providers. For example, the first antenna array 104*a* may be associated with a first cellular network provider. At some point after installation, the owner of the monopalm 100 may wish to co-locate an antenna for a second cellular network provider. Thus, the second antenna array 104*b* may be attached to the monopalm 100 via a respective mounting apparatus. Necessary hardware (e.g., a radio unit), cabling, and other such items may be added to the monopalm 100 to enable the second antenna array 104*b* to provide a cellular network. In other embodiments, the monopalm 100 may be deployed with the first and second antenna arrays 104*a-b* already installed.

The first and second sets of palm fronds 106*a-b* may be manufactured to create an appearance of a single palm frond head. Therefore, the first set of palm fronds 106*a* may be installed at a first angle (e.g., the angle $\theta$) such that the first set of palm fronds mimic those of a real palm tree. For example, the first respective angle may be within a range of 0° to 150°. The second set of palm fronds 106*b* may be installed at a second respective angle, within a range of 90° to 180°, inclusive. Each of the first and second set of palm fronds 106*a-b* may be attached to the monopole 108 via one or more band collars, configured to support one or more palm fronds. The band collars may be attached to the monopole 108 via compression fitting, welding, mechanical fastener (e.g., a screw or a bolt), or any other suitable connection.

Figure 2B:
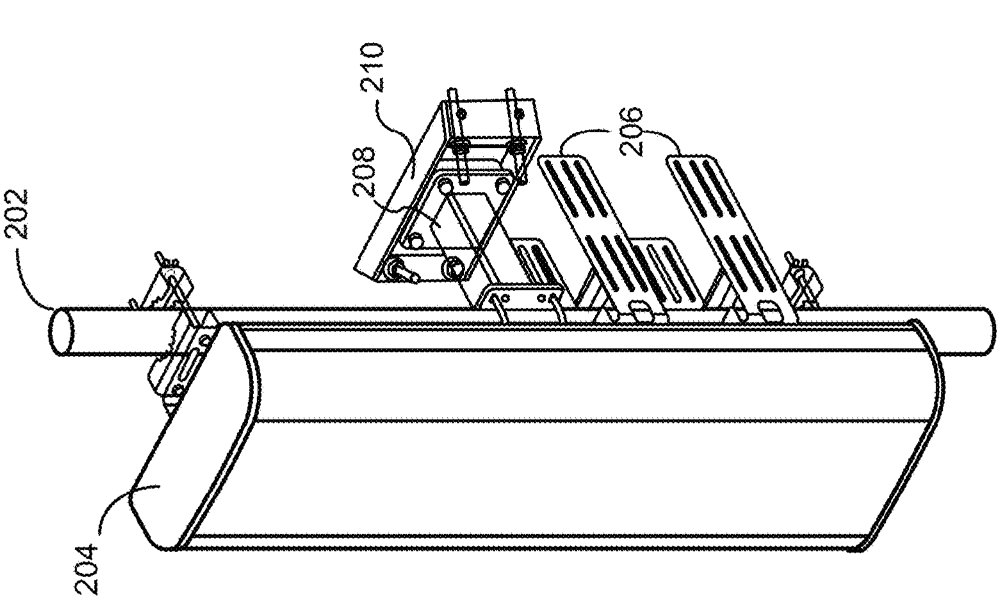
FIG. 2B illustrates an antenna array with a mounting apparatus, according to certain embodiments.
Figure 2A:
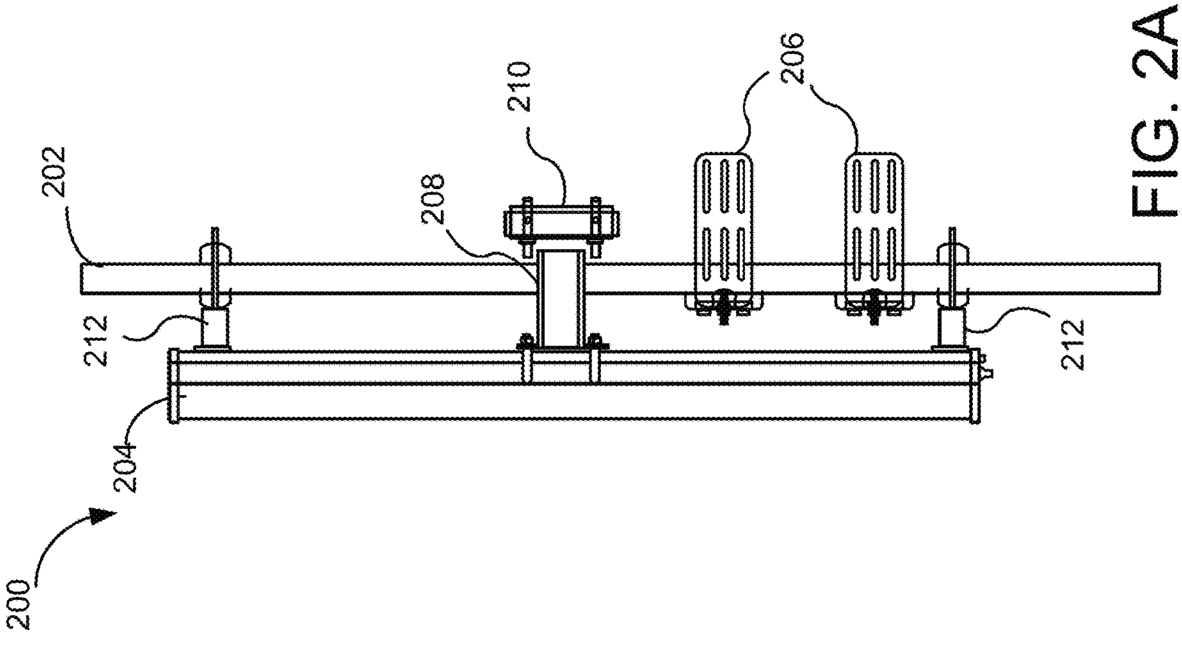
FIG. 2A illustrates a side view of an antenna array with a mounting apparatus, according to certain embodiments.

FIGS. 2A-B illustrate a mounting apparatus 200 with an antenna 204, according to certain embodiments. FIG. 2A illustrates a side view of the antenna array with the mounting apparatus. FIG. 2B illustrates a front view the antenna array with the mounting apparatus. They will be referenced together for illustrating the embodiments shown. The mounting apparatus 200 may be included in to the first and second antenna arrays 104*a-b* in FIG. 1. The mounting apparatus 200 may include a mounting pipe 202, one or more radio racks 206, a standoff 208, a mounting bracket 210, and an antenna arm 212. The components of the mounting apparatus 200 may enable the antenna 204 to be attached to a monopole (e.g., the monopole 108 in FIG. 1) and adjusted.

The mounting pipe 202 may be configured to mount the antenna 204 and via the antenna arms 212. The mounting pole 202 may also be connected to the standoff 208 via a mechanical connection (e.g., a U-shaped connector, a bolt, etc.). The standoff 208 may be connected to the mounting bracket 210 via a mechanical connection (e.g., bolts, screws, etc.). The mounting bracket 210 may be connected to the monopole (not pictured). The mounting apparatus 200 may only show a portion of the mounting apparatus used to connect the first and second antenna arrays 104*a-b* to the monopalm 100 in FIG. 1. For example, a mounting apparatus may include any number of antennas, and a corresponding number of mounting apparatuses similar to the mounting apparatus 200.

The standoff 208 may be configured to support the antenna 204 at a distance from the monopole. In some embodiments, the standoff 208 may be a solid piece of material, and this the distance between the antenna and the monopole. In other embodiments, the standoff 208 may be adjustable e.g., between 5 to 48 inches, inclusive), such that the antenna 204 may be moved closer or farther from the monopole.

The antenna arms 212 may be configured to extend outwardly from the mounting pole 202. In some embodiments, both antenna arms 212 may extend that same distance from the mounting pole, such that the antenna 204 is parallel to the mounting pole 202. In other embodiments, the antenna arms may be configured to extend to differing lengths. For example, the top antenna arm 212 may extend such that the antenna 204 may be angled down with respect to the ground. Additionally or alternatively, the bottom antenna arm 212 may extend such that the antenna 204 may be angled up with respect to the ground.

The mounting apparatus 200 may also include radio racks 206. The radio racks 206 may be rotatable, so as to have different radio mounting positions. The rotatable racks 206 may allow the radio in the radio racks 206 to be positioned close to the back of the antenna 204. This may be desired when the antenna 204 is attached to the monopole to create an appearance of a single palm frond head, by mating up to the first location on the monopole (such as the first location 102 shown in FIG. 1). Rotatability of the radio racks 206 may also facilitate desired radio positions to ensure shorter cable connections with the antenna 204 and as well as to reduce the equipment's visual impact to the appearance of the monopalm. In some embodiments, the rotatability of an individual radio rack 206 is achieved by having a rotatable mount clamped to the mounting pipe 202 to attach the radio rack 206.

The mounting bracket 210 may be used to attach the portion to the monopole. In some embodiments, the mounting bracket may include a clamp, of various shapes to ensure adequate and secure attachment of the equipment to the monopole. Together with a shortened length of the standoff 208, the mounting bracket 210, may reduce the space between the antenna 204 and monopole.

Figure 3:
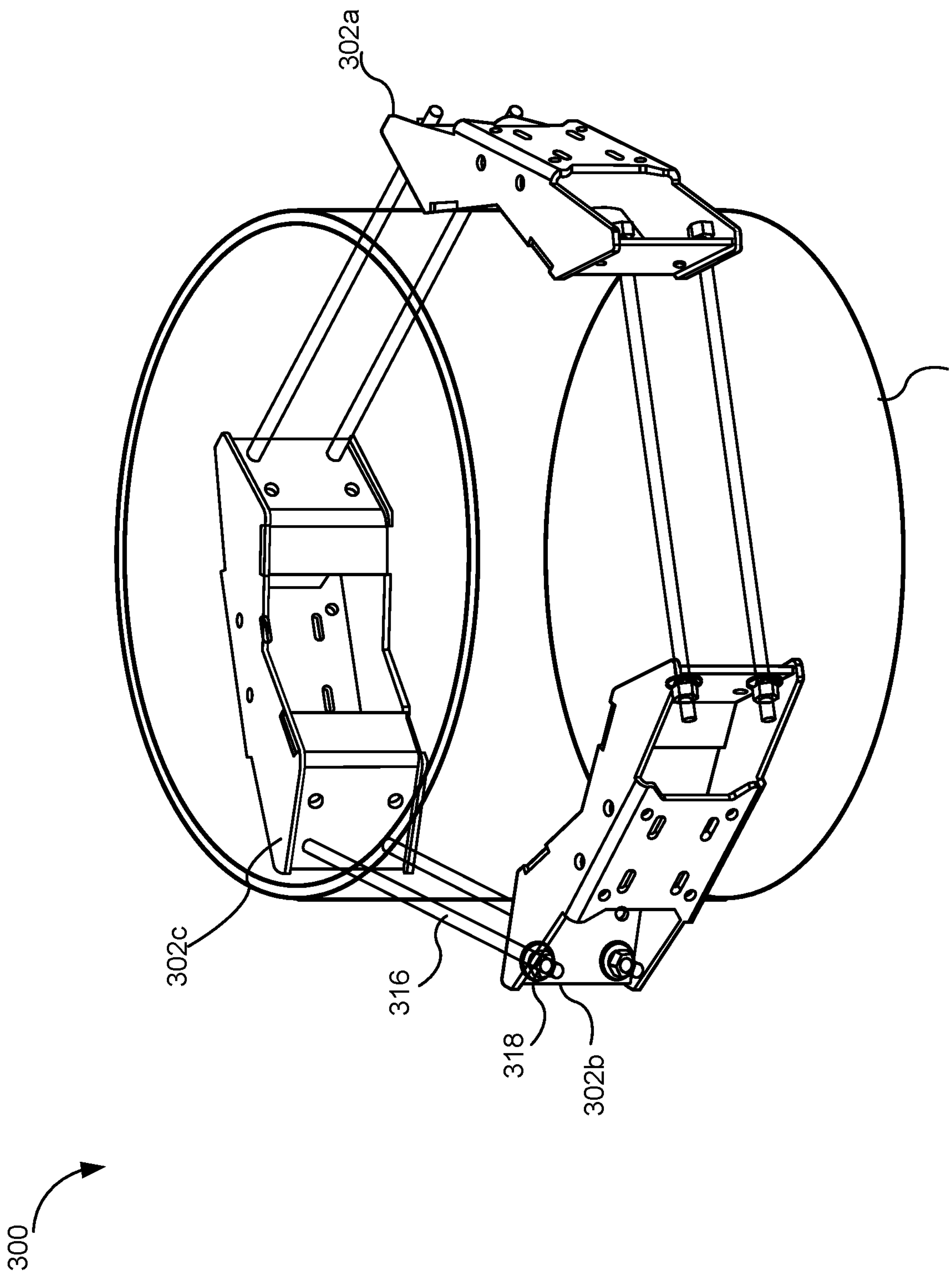
FIG. 3 illustrates a mounting system of a mounting apparatus for collocating antenna arrays, according to certain embodiments.

FIG. 3 illustrates a mounting system 300 of a mounting apparatus for collocating antenna arrays, according to certain embodiments. The mounting system 300 may include mounting brackets 302*a-c*, tension rods 316, and fasteners 318. The mounting brackets 302*a-c* may be similar to the clamp 210 in FIGS. 2A-B. Each of the mounting brackets 302*a-c* may therefore be mechanically connected to other components of a mounting apparatus such as the mounting apparatus 200 in FIG. 2. Thus, the clamping system 300 may permit multiple antennas to be attached to the monopole 108, creating an antenna array such as the antenna arrays 104*a-b* in FIG. 1.

The mounting brackets 302*a-c* may be attached to the monopole 108 via a compression force. The compression may be provided at least in part by the tension rods 316. Each tension rod 316 may include threads on each end of the tension rod 316. The tension rod 316 may extend between two of the mounting brackets 302*a-c*. The tension rods 316 may extend through an opening in adjacent clamps of the mounting brackets 302*a-c*. The fasteners 318 may be attached via the threads on each end of the tension rods 316. The fasteners 318 on either end of the tension rod 316 may be tightened, pulling the adjacent clamps together, resulting in a compression force between the mounting brackets 302*a-c* inwards towards the monopole 108.

A distance between each of the mounting brackets 302*a-c* may be adjusted to create a desired sectional mount for specific antenna placement and alignment in the antenna array. In some embodiments, the vertical height of the clamp may be adjusted to alter a vertical placement of the antennas and related equipment (e.g., a radio unit). The vertical height may also be adjusted to merge with the appearance of a first set of palm fronds at the first location such as the first location 104 shown in FIG. 1. Although only three mounting brackets 302*a-c* are shown, there may be any number of clamps present in the mounting system 300 (e.g., 2, 5, 6, etc.).

Figure 4A:
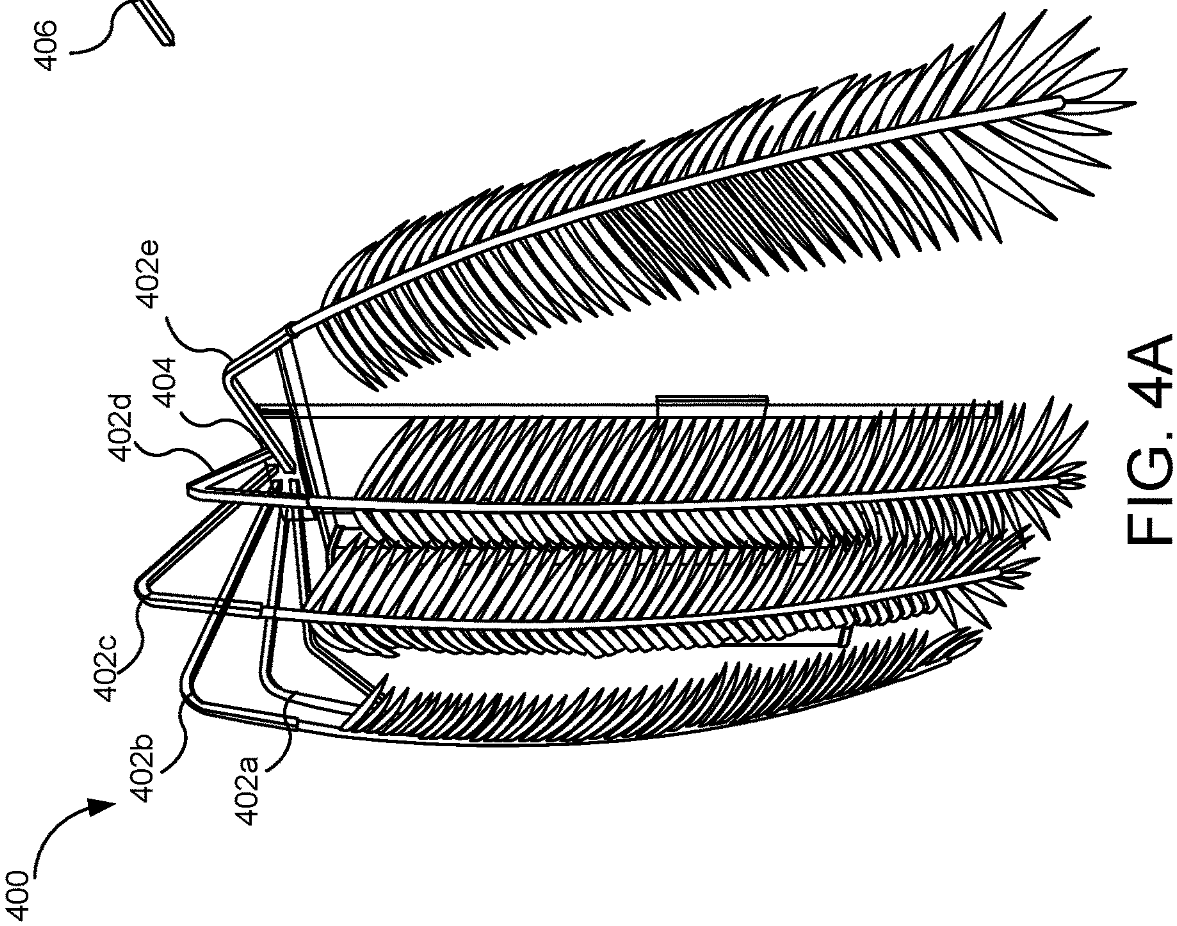
FIG. 4A illustrates palm fronds attached to a band collar, according to certain embodiments.
Figure 4B:
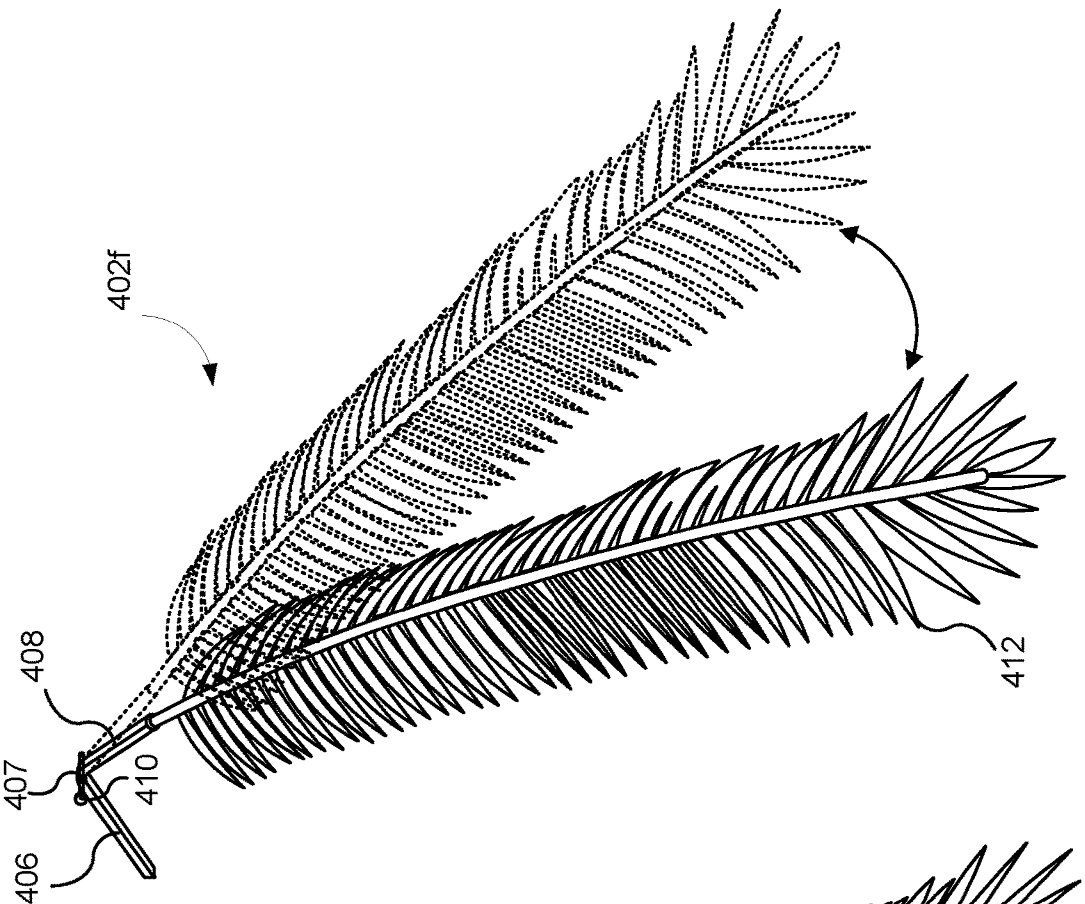
FIG. 4B illustrates an adjustable palm frond, according to certain embodiments.

FIG. 4A illustrates a set of palm fronds 400 attached to a band collar, according to certain embodiments. FIG. 4B illustrates an adjustable palm frond 402*f*, according to certain embodiments. They will be referenced together for illustrating the embodiment shown. The set of palm fronds 400 may be similar to the second set of palm fronds 106*b* in FIG. 1. The set of palm fronds 400 may include one or more palm fronds 402*a-f*, attached to a band collar 404. Each of the palm fronds 402*a-f* may include a shaft with a horizontal section 406, a corner 407, and a down section 409. Each down section 409 may further include a plurality of leaves (e.g., the leaf 412). The leaves may appear to mimic palm leaves or other leaves, to disguise a monopole as a real tree.

The band collar 404 may be attached to a monopole such as the monopole 108 in FIG. 1. In some embodiments, the band collar 404 may be attached to the monopole by welding or other techniques. In other embodiments, the band collar may be attached to the monopole via compression forces, similar to the clamping system 300 in FIG. 3. The palm fronds 402*a-e* may be attached to the band collar 404 via welding techniques, a mechanical connection (e.g., bolts, screws, etc.) or any other appropriate connection.

The corner 407 may form an angle between the horizontal section 406 and the down section 408. In some embodiments, the corner 407 may be formed by bending or altering the shaft in order to create an angle. In the example of the second set of palm fronds 106*b* in FIG. 1, the angle may be between 90° and 180°, as measured between the horizontal section 406 and the down section 408. In other embodiments, the horizontal section 406 and the down section 408 may be separate pieces. The horizontal section 406 and the down section 408 may then be joined at the corner 407. To join the horizontal section 406 and the down section 408, a connector 410 may be inserted through both the horizontal section 406 and the down section 408. The connector 410 may be a pin, a bolt, a carriage bolt, and/or other suitable mechanism for joining the horizontal section 406 and the down section 408. The connector 410 may be configured such that the down section 408 may be adjusted and/or locked into a position.

In an example, the palm frond 402*f* may be adjusted. While in a first position the down section 408 may for a 90° angle with the horizontal section 406. The down section 408 may be locked in the first position via the connector 410. The connector 410 may then be unlocked, and then down section 408 may be moved and locked into a second position via the connector 410. While in the second position, the down section 408 may form a second angle with the horizontal section 406 (e.g., 115°, 130°, 180°, etc.). By adjusting the angle of the palm frond 402*f*, the appearance of the set of palm fronds 400 may be adjusted to better appear as a real palm tree. Additionally, the palm frond 402*f* may permit access to an antenna array hidden behind the set of palm fronds 400 to perform repairs, retrofits, etc.

Although the palm fronds 402*a-e* are shown as having a single shaft, bent at a corner, it should be understood that all or some of the palm fronds a-e may be adjustable similar to the palm frond 402*f*. The band collar 404 may therefore include one or more adjustable palm fronds (e.g., the palm frond 402*f*) and/or fixed palm fronds. It should also be understood that a monopalm such as the monopalm 100 in FIG. 1 may include one or more band collars each with palm fronds similar to the palm fronds 402*a-f*, arranged about the monopole. The one or more band collars may be attached to an existing monopalm in order to collocate antenna arrays for multiple cellular network providers. In other embodiments, the one or more band collars may be attached to a monopalm during initial manufacture, such the monopalm may enable the collocation of antenna arrays for multiple cellular network providers.

Figure 5:
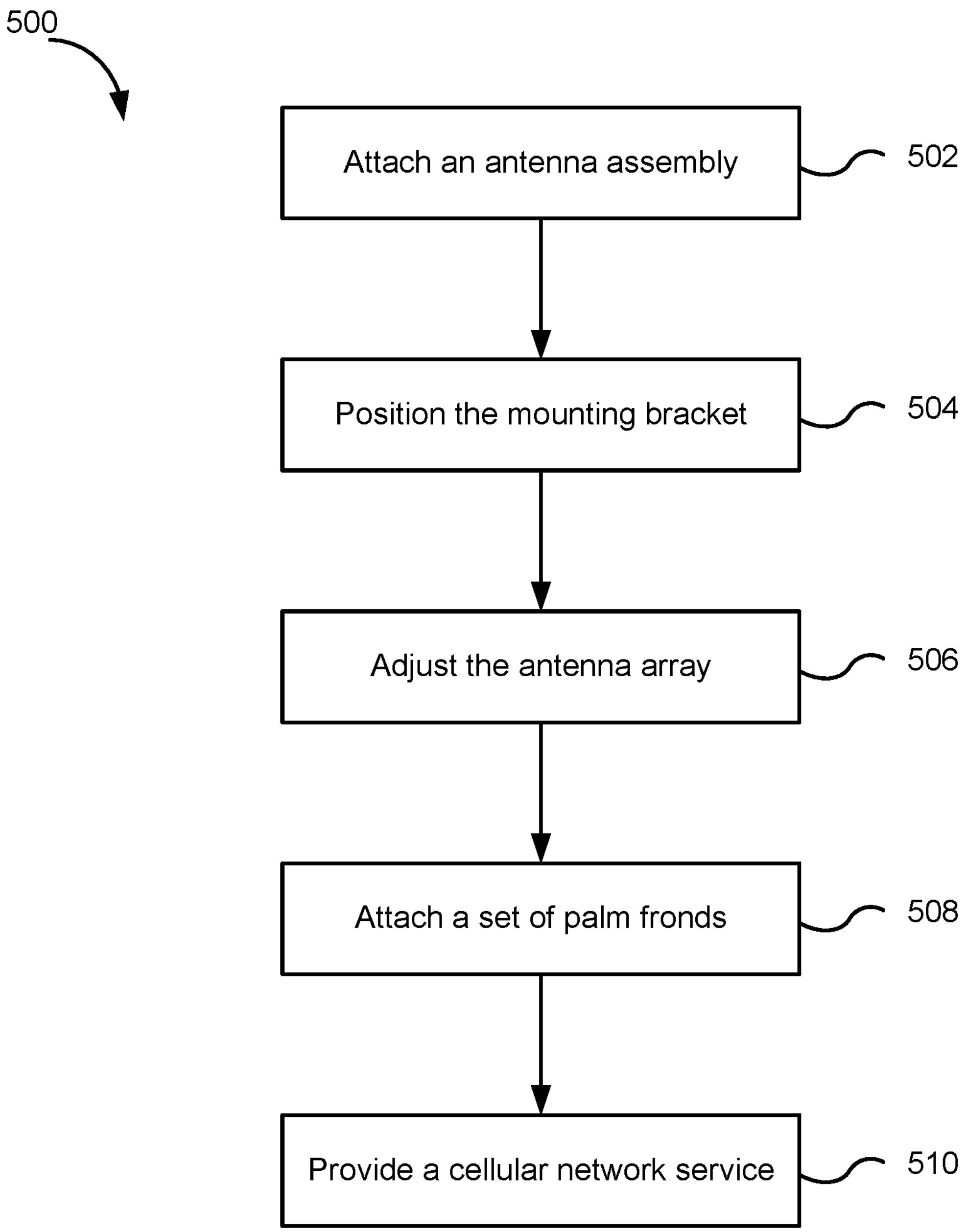
FIG. 5 illustrates a flowchart of a method for collocating antenna arrays on a monopole, according to certain embodiments.

FIG. 5 illustrates a flowchart of a method 500 for collocating antenna arrays on a monopalm, according to certain embodiments. The method 500 may be performed using some or all of the devices and systems described herein. For example, the method 500 may be performed to modify an existing monopalm such as the monopalm 108 in FIG. 1 to collocate antenna arrays for one or more cellular network providers. The steps of method 500 may be performed in a different order than is described and/or skipped altogether.

At step 502, the method 500 may include attaching an antenna assembly to an existing cellular antenna structure. The existing cellular antenna structure may include a first antenna array associated with a first cellular network provider. The existing cellular antenna structure may be a monopalm such as the monopalm 108 in FIG. 1. The antenna assembly may include a mounting apparatus such the mounting apparatus described in FIG. 2. The antenna assembly may therefore include a mounting bracket, an antenna standoff, a radio unit, and a second antenna array. The mounting bracket may include one or more clamps (e.g., the clamp 210 in FIG. 2) and other components for attaching the second antenna array to the monopalm. The antenna standoff may be adjustable, such that the second antenna array may be moved radially inward or outward with respect to the monopole. The radio unit may include one or more components to enable wireless signals received by the second antenna array to be communicated with a cellular network. The radio unit may also enable wireless signals to be transmitted to a user equipment (UE) via the second antenna array. The mounting bracket, antenna standoff, radio unit, and the second antenna array may all be mechanically connected.

At step 504, the method 500 may include positioning the mounting bracket positioning the mounting bracket on the existing cellular antenna structure. The second antenna array is below the first antenna array. For example, the second antenna array may be placed in the second position 102*a* from FIG. 1. At step 506, the method 500 may include adjusting the second antenna array to achieve a performance metric. For example, the second antenna array may be rotated about the monopalm such that the second antenna array is directed towards a particular direction. The second antenna array may also be tilted towards the ground (as is described in relation to FIG. 2) in order to improve a cellular signal or other performance metric.

At step 508, the method 500 may include attaching a set of palm fronds to the monopalm. The set of palm fronds may obscure the second antenna array from view. The set of palm fronds may be similar to the set of palm fronds 400 in FIG. 4A. The set of palm fronds may be configured such that the monopalm mimics a real palm tree. The set of palm fronds may be angled towards the ground, to mimic the lower fronds of a palm tree. One or more of the palm fronds of the set of palm fronds may be adjustable, such that a position of the palm frond may be altered (e.g., the palm frond 402*f* in FIG. 4B).

At step 510, the method 500 may include providing a cellular network service using the second antenna array. Providing the cellular network service may also include using the radio unit and/or other components. The cellular network service may include networks such as 5G New Radio (NR), 4G LTE, 6G, 7G, etc. In some embodiments, the second antenna array may be associated with a different cellular network provider than that associated with the first antenna array. Thus, the existing antenna structure may now include collocated antenna arrays, associated with different cellular network providers. Because of the second set of palm fronds, the existing antenna structure may appear to be a real palm tree, with both the first and second antenna arrays obscured from view.

While the invention has been described in detail, modifications within the spirit and scope of the invention will be readily apparent to those of skill in the art. It should be understood that aspects of this invention and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by one of ordinary skill in the art. Furthermore, those of ordinary skill in the art will appreciate that the foregoing description is by way of example only and is not intended to limit the invention. All US patents and publications cited herein are incorporated by reference in their entirety.

What is claimed is:

1. A multi-antenna structure, comprising:

a monopole;

a first antenna array mechanically connected to the monopole at a first location via a first mounting apparatus, the first antenna array comprising a first cellular antenna and a first radio unit;

a second antenna array mechanically connected to the monopole at a second location via a second mounting apparatus, the second antenna array comprising a second cellular antenna and a second radio unit;

a first set of fronds arranged about an outer surface of the monopole wherein each of the first set of fronds forms a first respective angle with the monopole, configured to obscure the first antenna array from view, each of the first set of fronds comprising a shaft comprising a horizontal section and a down section, wherein the horizontal section and the down section meet at the first respective angle; and a second set of fronds arranged about the outer surface of the monopole wherein each of the second set of fronds forms a second respective angle with the monopole configured to obscure the second antenna array from view.

2. The multi-antenna structure of claim 1, wherein the first mounting apparatus comprises:

a first antenna standoff mechanically connected to the monopole and a first mounting pole, wherein the first antenna standoff provides an adjustable first distance between the first antenna array and the monopole; and the second mounting apparatus comprises:

a second antenna standoff mechanically connected to the monopole and a second mounting pole, wherein the second antenna standoff allows an adjustable second distance between the second antenna array and the monopole.

3. The multi-antenna structure of claim 1, wherein the first mounting apparatus and the second mounting apparatus are mechanically connected to the monopole via one or more clamps.

4. The multi-antenna structure of claim 1, wherein the first mounting apparatus and the second mounting apparatus allow the first antenna array and the second antenna array to be moved vertically along the monopole.

5. The multi-antenna structure of claim 1, wherein each of the first respective angles is within a first range of 0° to 150°, inclusive, and each of the second respective angles is within a second range of 90° to 180°, inclusive.

6. The multi-antenna structure of claim 1, further comprising:

one or more band collars attached to the monopole, wherein each of the one or more band collars supports one or more fronds of the first set of fronds and/or the second set of fronds.

7. The multi-antenna structure of claim 6, wherein each band collar of the one or more band collars is mechanically connected to another band collar of the one or more band collars and the one or more band collars are connected to the monopole via compression.

8. The multi-antenna structure of claim 1, wherein the first antenna array and the second antenna array allow the first cellular antenna and the second cellular antenna, respectively, to be tilted with respect to the monopole.

9. The multi-antenna structure of claim 1, wherein the first antenna array is associated with a first cellular network provider and the second antenna array is associated with a second cellular network.

10. The multi-antenna structure of claim 1, wherein the first antenna array and the second antenna array are associated with a first cellular network provider.

11. The multi-antenna structure of claim 1, wherein each frond of the second set of fronds comprises:

a shaft comprising a horizontal section and a down section, wherein the horizontal section and the down section meet at the second respective angle.

12. The multi-antenna structure of claim 11, wherein the horizontal section and the down section comprise separate pieces and are connected such that the second respective angle may be adjusted.

13. The multi-antenna structure of claim 1, wherein cabling is disposed within the monopole.

14. The multi-antenna structure of claim 1, wherein at least one of the first antenna array and the second antenna array comprises one or more components of a 5G cellular network.

15. The multi-antenna structure of claim 1, wherein the first respective angle and the second respective angle are adjustable.

16. A method, comprising:

attaching an antenna assembly on an existing cellular antenna structure comprising a first antenna array, the antenna assembly comprising:

a mounting bracket;

an antenna standoff;

a radio unit; and a second antenna array;

positioning the mounting bracket on the existing cellular antenna structure such that the second antenna array is below the first antenna array;

adjusting a position of the second antenna array to achieve a performance metric;

attaching a set of fronds configured to obscure the antenna assembly from view, wherein each of the set of fronds comprises a shaft comprising a horizontal section and a down section, wherein the horizontal section and the down section meet at a first respective angle; and providing cellular network service using the second antenna array.

17. The method of claim 16, wherein a horizontal section of a palm frond of the set of fronds and a down section of the palm frond comprise separate pieces and are connected such that the second respective angle may be adjusted.

18. The method of claim 16, wherein the set of fronds is angled towards the ground.

19. The method of claim 16, wherein the cellular network service comprises a 5G cellular network.

* * * * *